(12) United States Patent
Inanc et al.

(10) Patent No.: US 10,520,641 B2
(45) Date of Patent: Dec. 31, 2019

(54) GAMMA CALIBRATION

(71) Applicant: BAKER HUGHES INCORPORATED, Houston, TX (US)

(72) Inventors: Feyzi Inanc, Spring, TX (US); Toyli Anniyev, The Woodlands, TX (US); David M. Chace, Houston, TX (US); Randy Gold, Houston, TX (US); Otto Fanini, Houston, TX (US); Sandeep Gade, Spring, TX (US); Mohamed Daoud, The Woodlands, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 79 days.

(21) Appl. No.: 15/599,214

(22) Filed: May 18, 2017

(65) Prior Publication Data
US 2018/0335546 A1    Nov. 22, 2018

(51) Int. Cl.
G01V 13/00    (2006.01)
G01V 5/10     (2006.01)

(52) U.S. Cl.
CPC .............. G01V 13/00 (2013.01); G01V 5/102 (2013.01); G01V 5/105 (2013.01)

(58) Field of Classification Search
CPC ................................. G01V 13/00; G01V 5/105
See application file for complete search history.

(56) References Cited

U.S. PATENT DOCUMENTS

| | | | | |
|---|---|---|---|---|
| 4,031,367 A | * | 6/1977 | Murphy | G01V 5/102 250/253 |
| 4,287,415 A | * | 9/1981 | Arnold | E21B 47/1015 250/269.6 |

(Continued)

FOREIGN PATENT DOCUMENTS

WO    WO2017039968 A1    3/2017

OTHER PUBLICATIONS

Laboratory and Field Evaluation of an Inelastic Neutron Scattering and Capture Gamma Ray Spectrometry Tool Article in Society of Petroleum Engineers Journal 20(5):327-340, Oct. 1980.

(Continued)

*Primary Examiner* — Christine S. Kim
(74) *Attorney, Agent, or Firm* — Mossman, Kumar & Tyler, P.C.

(57) ABSTRACT

Estimating parameters of interest of a formation, including density, porosity, and fluid saturation. Methods relate to gamma ray energy spectra calibration for a radiation detector including generating a calibration radiation spectrum using measurements of radiation with the detector in a time interval wherein the radiation comprises predominantly gamma rays emitted by decay of radionuclides produced by neutron activation reactions resulting from neutron irradiation, the time interval following a prior time interval corresponding to thermal neutrons produced from the irradiation; making at least one other radiation measurement with the detector outside the time interval; and producing a calibrated radiation measurement from the at least one other radiation measurement using the calibration radiation spectrum. The measurements may be taken in the time interval by conveying the radiation detector in the borehole at high speed and using a background gate of the detector.

20 Claims, 7 Drawing Sheets

(56) References Cited

U.S. PATENT DOCUMENTS

| | | | |
|---|---|---|---|
| 4,390,783 A | 6/1983 | Grau | |
| 4,394,574 A | 7/1983 | Grau et al. | |
| 4,585,939 A * | 4/1986 | Arnold | G01V 5/06 250/256 |
| 4,712,424 A | 12/1987 | Herron | |
| 5,235,185 A * | 8/1993 | Albats | G01V 5/105 250/266 |
| 5,471,057 A | 11/1995 | Herron | |
| 5,539,788 A | 7/1996 | Ruddy et al. | |
| 7,482,578 B2 | 1/2009 | Randall | |
| 2010/0327154 A1 * | 12/2010 | Vaeth | G01V 5/107 250/269.6 |
| 2011/0012012 A1 * | 1/2011 | Stein | G01T 1/17 250/252.1 |
| 2013/0048849 A1 * | 2/2013 | Li | G01V 5/101 250/269.8 |
| 2013/0211724 A1 * | 8/2013 | Fitzgerald | G01V 5/101 702/8 |
| 2014/0217273 A1 * | 8/2014 | Grau | G01V 5/04 250/252.1 |
| 2015/0001383 A1 | 1/2015 | Inanc et al. | |
| 2016/0146948 A1 | 5/2016 | Hovgaard | |
| 2016/0370494 A1 * | 12/2016 | Zhou | G01T 1/17 |
| 2017/0315260 A1 * | 11/2017 | Stoller | G01V 5/104 |
| 2017/0363770 A1 * | 12/2017 | Mauborgne | G01V 13/00 |
| 2018/0329090 A1 * | 11/2018 | McCleskey | G01T 7/005 |

OTHER PUBLICATIONS

Westway, "Neutron-Induced Gamma Ray Spectroscopy for Reservoir Analysis," Jun. 1983.

Hertzog, "Laboratory and Field Evaluation of an Inelastic-Neutron-Scattering and Capture Gamma Ray Spectroscopy Tool", SPE 7430, 1978.

Grau et al., SPE "Prompt Gamma-Ray Spectral Analysis of Well Data Obtained with NaI(T1) and 14 MeV Neutrons," 1986, SPE9461, 1980.

Roscoe et al., "Statistical Precision of Neutron-Induced Gamma Ray Spectroscopy Measurements," Nov.-Dec., The Log Analyst, 1987.

PCT/US2018/033438—International Search Report dated Sep. 11, 2018.

* cited by examiner

GAMMA CALIBRATION

FIELD OF THE DISCLOSURE

In one aspect, this disclosure generally relates to methods, devices and systems for estimating at least one parameter of interest relating to a volume using nuclear radiation based measurements.

BACKGROUND OF THE DISCLOSURE

Well logging systems have been utilized in hydrocarbon exploration for many years. Such systems provide data for use by geologists and petroleum engineers in making many determinations pertinent to hydrocarbon exploration. In particular, these systems provide data for subsurface structural mapping, defining the lithology of subsurface formations, identifying hydrocarbon-productive zones, and interpreting reservoir characteristics and contents.

One class of systems seeks to measure incidence of nuclear particles on the well logging tool from the formation for purposes well known in the art. These systems take various forms, including those measuring natural gamma rays from the formation. Still other systems measure gamma rays in the formation caused by bursts of neutrons into the formation by a pulsed neutron source carried by the tool. A rigid or non-rigid conveyance device is often used to convey the nuclear radiation source, often as part of a tool or a set of tools, and the carrier may also provide communication channels for sending information up to the surface.

SUMMARY OF THE DISCLOSURE

In aspects, the present disclosure is related to methods and apparatuses for estimating at least one parameter of interest of a volume of interest of an earth formation using nuclear radiation based measurements.

Aspects may include methods, systems, and devices for gamma ray energy spectra calibration for a radiation detector in a borehole intersecting a volume of an earth formation. Methods may include irradiating the earth formation with a neutron pulse produced by a pulsed neutron source disposed in the borehole to produce gamma-rays; generating a calibration radiation spectrum using measurements of radiation with the detector in a time interval wherein the radiation comprises predominantly gamma rays emitted by decay of radionuclides produced by neutron activation reactions resulting from the irradiation, the time interval following a prior time interval, wherein the prior time interval corresponds with thermal neutrons produced from the irradiation and begins with the cessation of the neutron pulse; making at least one other radiation measurement with the detector outside the time interval; and producing a calibrated radiation measurement from the at least one other radiation measurement using the calibration radiation spectrum. Each of the measurements and the other measurements may comprise a count having an associated relative energy channel, and the calibration radiation spectrum comprises an expression of gamma ray count rate with respect to relative energy channel for the measurements of radiation with the detector in the time interval.

Producing the calibrated radiation measurement may be carried out by identifying at least one peak associated with a radionuclide resulting from neutron activation reactions; and assigning an energy level to each radiation measurement of the at least one other radiation measurement in dependence upon a standard energy level corresponding to each of the at least one peak. Assigning an energy level to each radiation measurement may include using the standard energy level corresponding to each of the at least one peak to generate a mapping function associating the calibration radiation spectrum to the standard energy level corresponding to each of the at least one peak; and using the mapping function to associate relative energy channels with corresponding final energy values. Assigning the energy level may be carried out by determining a correction factor using the standard energy level corresponding to each of the at least one peak, and producing a calibrated radiation measurement by applying the correction factor to the at least one other radiation measurement. Methods may include generating a calibrated measurement spectrum.

The at least one other radiation measurement made in the at least one other time interval may measure radiation comprising gamma rays predominantly resulting from at least one of inelastic scattering and capture of neutrons. Methods may include making the measurements in the time interval following irradiation by conveying the radiation detector in the borehole at high speed and using a background gate of the detector.

Alternatively, methods may include determining a mean channel for the calibration radiation spectrum; using a standard energy level corresponding to the mean channel to generate a mapping function; and using the mapping function to associate relative energy channels with corresponding final energy values. Methods may include conducting further operations in the formation in dependence upon the calibrated radiation measurement.

Apparatus embodiments may include at least one radiation detector configured for conveyance by a carrier and configured to generate information representative of nuclear radiation from the formation; and an information processing device configured to: generate a calibration radiation spectrum using measurements of radiation with the detector in a time interval wherein the radiation comprises predominantly gamma rays emitted by decay of radionuclides produced by neutron activation reactions resulting from the irradiation, the time interval following a prior time interval, wherein the prior time interval corresponds with thermal neutrons produced from the irradiation and begins with the cessation of the neutron pulse; make at least one other radiation measurement with the detector outside the time interval; and produce a calibrated radiation measurement from the at least one other radiation measurement using the calibration radiation spectrum.

Each of the measurements and the at least one other measurement may comprise a count having an associated relative energy channel, and the calibration radiation spectrum comprises an expression of gamma ray count rate with respect to relative energy channel for the measurements of radiation with the detector in the time interval.

Embodiments may employ a pulsed neutron source. The information processing device may comprise at least one processor; and a memory storage medium accessible to the at least one processor. Methods as described above implicitly utilize at least one processor. Some embodiments include a non-transitory computer-readable medium product accessible to the processor and having instructions thereon that, when executed, causes the at least one processor to perform methods described above. Apparatus embodiments may include, in addition to specialized borehole measurement equipment and conveyance apparatus, at least one processor and a computer memory accessible to the at least one processor comprising a computer-readable medium having instructions thereon that, when executed, causes the at least one processor to perform methods described above.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
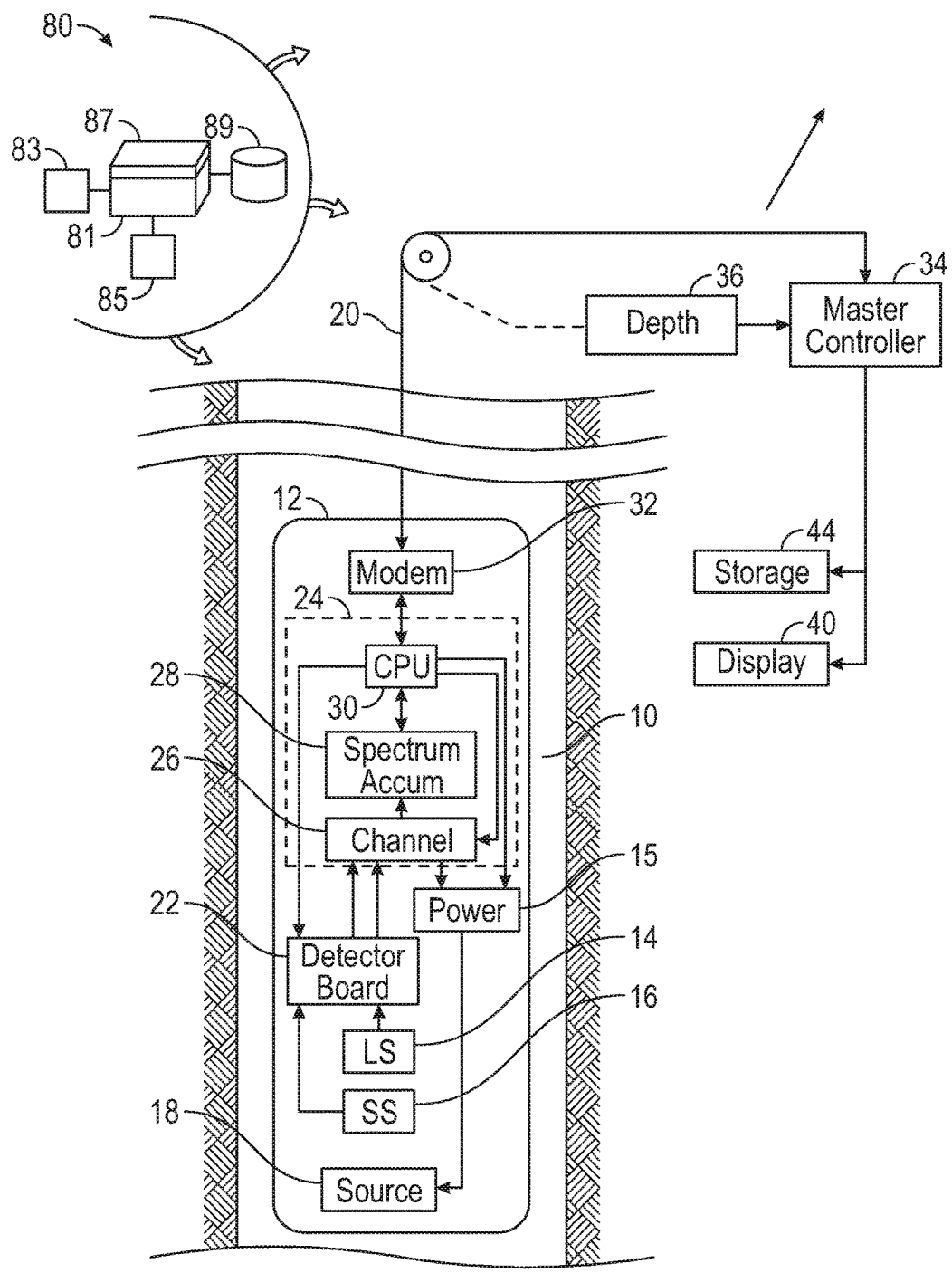
FIG. 1A illustrates a nuclear well logging system in accordance with embodiments of the present disclosure.

In aspects, this disclosure relates to estimating at least one parameter of interest of a volume of interest by detecting radiation incident on the tool and, more particularly, to properly calibrating radiation measurement systems. In some aspects, this disclosure relates to estimating a parameter of interest (related to a volume of interest) from radiation information. The volume may include an earth formation, such as, for example, an earth formation surrounding a borehole. The parameter of interest may be a physical characteristic of the volume, such as, for example, density.

In these nuclear well logging systems, reliance is made upon the physical phenomenon that the energies of gamma rays given off by nuclei resulting from natural radioactive decay or induced nuclear radiation are indicative of the presence of certain elements within the formation. In other words, formation elements will react in predictable ways, for example, when high-energy neutrons on the order of 14.2 MeV collide with the nuclei of the formation elements. Different elements in the formation may thus be identified from characteristic gamma ray energy levels released as a result of this neutron bombardment. Thus, the number of gamma rays at each energy level will be functionally related to the quantity of each element present in the formation, such as the element carbon, which is present in hydrocarbons. The presence of gamma rays at a 2.2 MeV energy level may for example, indicate the presence of hydrogen, whereas predominance of gamma rays having energy levels of 4.43 and 6.13 MeV, for example, may indicate the presence of carbon and oxygen respectively.

In these nuclear well logging systems, it is frequently useful to obtain data regarding the spectral distributions of the occurrence of the gamma rays. Such data can yield extremely valuable information about the formation, such as identification of lithologies that are potentially-hydrocarbon producing. Moreover, these desired spectral data may not only be limited to that of natural gamma rays, for example, but also may be desired for the gamma ray spectra caused by bombardment of the formation with the aforementioned pulsed neutron sources.

Well logging systems for measuring neutron absorption in a formation may use a pulsed neutron source providing bursts of very fast, high-energy neutrons. Pulsing the neutron source permits the measurement of the macroscopic thermal neutron absorption capture cross-section $\Sigma$ of a formation. The capture cross-section of a reservoir rock is indicative of the porosity, formation water salinity, and the quantity and type of hydrocarbons contained in the pore spaces.

The measurement of neutron population decay rate may be made cyclically. The neutron source is pulsed for 20-40 microseconds to create a neutron population. Neutrons leaving the pulsed source interact with the surrounding environment and are slowed down. In a well logging environment, collisions between the neutrons and the surrounding fluid and formation atoms act to slow these neutrons. Such collisions may impart sufficient energy to these atoms to leave them in an excited state, from which after a short time gamma rays are emitted as the atom returns to a stable state. Such emitted gamma rays are labeled inelastic gamma rays. As the neutrons are slowed to the thermal state, they may be captured by atoms in the surrounding matter. Atoms capturing such neutrons are also caused to be in an excited state, and after a short time gamma rays are emitted as the atom returns to a stable state. Gamma rays emitted due to this neutron capture reaction are labeled capture gamma rays. In wireline well logging operations, as the neutron source is pulsed and the measurements made, the subsurface well logging instrument is continuously pulled up through the borehole. This makes it possible to evaluate formation characteristics over a range of depths.

Depending on the material composition of the earth formations proximal to the instrument, the thermal neutrons can be absorbed, or "captured", at various rates by certain types of atomic nuclei in the earth formations. When one of these atomic nuclei captures a thermal neutron, it emits a gamma ray, which is referred to as a "capture gamma ray". Prior art methods exist for determining attributes of a formation from logging results. See, for example, U.S. Pat. No. 4,712,424, to Herron, U.S. Pat. No. 4,394,574, to Grau et al., U.S. Pat. No. 4,390,783, to Grau, SPE 7430 "Laboratory and Field Evaluation of an Inelastic-Neutron-Scattering and Capture Gamma Ray Spectroscopy Tool", 1978, by Hertzog, SPE9461, 1980; SPE "Prompt Gamma-Ray Spectral Analysis of Well Data Obtained with NaI(Tl) and 14 MeV Neutrons," 1986, by Grau and Schweitzer; and Neutron-Induced Gamma Ray Spectroscopy for Reservoir Analysis, June 1983, by Westaway et al, U.S. Pat. No. 5,471,057, to Herron, and "Statistical Precision of Neutron-Induced Gamma Ray Spectroscopy Measurements" by Roscoe et al., November-December, 1987, The Log Analyst.

In gamma ray spectroscopy, a data acquisition system typically bins recorded gamma rays as a function of the voltage level resulting from each gamma ray as generated by the measurement system. The recorded gamma ray spectrum is then provided as a function of the channels. The channels by themselves are not meaningful for gamma ray spectroscopy applications, but may become useful if they are converted to an expression given in terms of energy. Therefore, spectroscopy implementations may have a step where the spectra recorded in terms of channels are mapped into spectra expressed in terms of energy (e.g., counts with respect to energy).

This energy mapping may be carried out by identifying relevant peaks with known energy levels and then generating a transfer function based on the particular channel in which those peaks are located. Generally, this mapping function may be a linear function or very close to linear function. To carry this process out, determining the peaks and their locations is a prerequisite.

In some cases, especially when the spectrum is very convoluted with peaks from many gamma ray sources with poor resolution, determining the location of the peaks may become problematic, and as a result generation of a mapping function becomes difficult with a high level of uncertainty. Contexts involving many gamma ray sources include pulsed neutron applications. In such applications, there are gamma rays originating from many elements in the sample, with multiple energy lines from each.

Techniques of the Present Disclosure

The present disclosure includes methods, systems, and devices utilizing activation gamma rays to calibrate gamma ray spectra. That is, a calibration radiation spectrum may be generated using measurements of radiation comprising predominantly gamma rays emitted by decay of radionuclides produced by neutron activation reactions resulting from irradiation of an earth formation (e.g., with pulsed neturons). This may be carried out by generating a calibration radiation spectrum using measurements of radiation while the detector is in a time interval wherein the radiation comprises predominantly gamma rays emitted by decay of radionuclides produced by neutron activation reactions resulting from the irradiation. In aspects, radiation information is acquired via measurement data in the background gate.

Generally, method embodiments may include irradiating the earth formation with a neutron pulse produced by a pulsed neutron source disposed in the borehole to produce gamma-rays; generating a calibration radiation spectrum using measurements of radiation with the detector in a time interval wherein the radiation comprises predominantly gamma rays emitted by decay of radionuclides produced by neutron activation reactions resulting from the irradiation, the time interval following a prior time interval, wherein the prior time interval corresponds with thermal neutrons produced from the irradiation and begins with the cessation of the neutron pulse; making at least one other radiation measurement with the detector outside the time interval; and producing a calibrated radiation measurement from the at least one other radiation measurement using the calibration radiation spectrum.

For example, for many downhole applications, the volume surrounding the borehole and in the borehole may contain a significant amount of oxygen. A significant portion of this oxygen may be an oxygen-16 nuclide. When oxygen-16 is irradiated by neutrons, the interaction of the neutrons with the oxygen-16 nuclide may result in a nitrogen-16 radionuclide which may emit certain gamma rays. In another mode, fast neutrons can inelastically scatter from oxygen-16 nuclei and increase the nuclear energy states. This may result in a gamma emission so that the nucleus can go back to stable energy state.

The intensity and the energy spectrum of the neutrons from the source while it is traveling in proximity to a volume of interest of the formation may determine the amount of activation that takes place in the volume of interest. The response from the activation may be in the form of delayed nuclear radiation, such as gamma rays from the radioactive decay of the isotopes, and the amount of nuclear radiation may be a function of the amount of radioactive isotopes present. Herein, nuclear radiation includes particle and non-particle radiation emitted by atomic nuclei during nuclear processes (such as radioactive decay and/or nuclear bombardment), which may include, but are not limited to, photons from neutron inelastic scattering and from neutron thermal capture reactions, neutrons, electrons, alpha particles, beta particles, and pair production photons. Short half-life radioisotopes can be built up to saturation levels very rapidly. Therefore, logging speed should be high so that gamma rays from short lived radioisotopes can be recorded before they decay to insignificant levels. Since there will be photons from other activated isotopes, gamma rays from a specific radioisotope can be determined only if they can be separated from the total counts. Herein, the division between low and high logging speeds is the point where the nuclear radiation detectors are moving fast enough that, when the nuclear radiation detectors pass the activated volume of interest, nuclear radiation contributions from short half-life radioiosotopes are significant to the overall nuclear radiation level.

Methods in accordance with embodiments of the present disclosure may thus include irradiating the earth formation with a pulsed neutron source disposed in the borehole to produce gamma-rays; generating a calibration radiation spectrum using measurements of radiation with the detector in a time interval following irradiation, wherein the radiation comprises gamma rays predominantly resulting from oxygen activation; making at least one other radiation measurement with the detector in at least one other time interval; and producing a calibrated radiation measurement from the at least one other radiation measurement using the calibration radiation spectrum.

Each of the embodiments herein may be used in a variety of settings in both drilling and non-drilling environments. In some implementations, the disclosed embodiments may be used in connection with LWD or MWD tools as part of a drilling system, while in other implementations embodiments may be incorporated into other types of well tools, such as wireline or slickline systems.

Referring now to the drawings in more detail, and particularly to FIG. 1A, there is illustrated a nuclear well logging configuration in accordance with the present invention. Well 10 penetrates the earth's surface and may or may not be cased depending upon the particular well being investigated. Disposed within well 10 is subsurface well logging instrument 12. The system diagramed in FIG. 1A is a microprocessor-based nuclear well logging system using multi-channel scale analysis for determining the timing distributions of the detected gamma rays. Well logging instrument 12 includes long-spaced (LS) detector 14, short-spaced (SS) detector 16 and pulsed neutron source 18. In an exemplary embodiment, LS and SS detectors 14 and 16 may be comprised of LYSO ($Lu^1$-xYxSi$^2$O$^5$) crystals coupled to photomultiplier tubes. In other examples, crystals of CsI (Na), NaI(Tl), BGO or GSO may be used, or joined fiber materials may be employed which are made up of fibers comprising crystalline scintillation materials (e.g., LuAG and YAG), amorphous glass, nanostructured glass ceramics, and so on.

To protect the detector systems from the high temperatures encountered in boreholes, the detector system may be mounted in a Dewar-type flask. Also, in an exemplary embodiment, source 18 comprises a pulsed neutron source using a D-T reaction wherein deuterium ions are accelerated into a tritium target, thereby generating neutrons having an energy of approximately 14 MeV. The filament current and accelerator voltage are supplied to source 18 through power supply 15. Cable 20 suspends instrument 12 in well 10 and contains the required conductors for electrically connecting instrument 12 with the surface apparatus.

The outputs from LS and SS detectors 14 and 16 are coupled to detector board 22, which amplifies these outputs and compares them to an adjustable discriminator level for passage to channel generator 26. Channel generator 26 converts the output pulse heights to digital values, which are accumulated into pulse height spectra, in which the pulses are sorted according to their amplitudes into a discrete array of bins. The bins uniformly divide the entire amplitude range. These pulse height spectra are accumulated in registers in the spectrum accumulator 28, the spectra being sorted according to their type: inelastic, capture, or background. After a pulse height spectrum has been accumulated, CPU 30 controls the transfer of the accumulated data to the modem 32, which is coupled to cable 20 for transmission of the data over a communication link to the surface apparatus. To be explained later are further functions of CPU 30 in communicating control commands which define certain operational parameters of instrument 12 including the discriminator levels of detector board 22, and the filament current and accelerator voltage supplied to source 18 by power supply 15.

The surface apparatus includes master controller 34 coupled to cable 20 for recovery of data from instrument 12 and for transmitting command signals to instrument 12. There is also associated with the surface apparatus depth controller 36 which provides signals to master controller 34 indicating the movement of instrument 12 within well 10. An input terminal may be coupled to master controller or processor 34 to allow the system operator to provide selected input into master controller 34 for the logging operation to be performed by the system. Display unit 40, and storage unit 44 coupled to the master controller 34 may be provided. The data may also be sent by a link to a remote location. Processing may be done either by the surface processor, at the remote site, or by a downhole processor.

Master controller 34 initially transmits system operation programs and command signals to be implemented by CPU 30, such programs and signals being related to the particular well logging operation. Instrument 12 is then caused to traverse well 10 in a conventional manner, with source 18 being pulsed in response to synchronization signals from channel generator 26. Typically, source 18 is pulsed at a rate of 10,000 bursts/second (10 kHz). This, in turn, causes a burst of high-energy neutrons on the order of 14 MeV to be introduced into the surrounding formation to be investigated. In a manner previously described, this population of high energy neutrons introduced into the formation will cause the generation of gamma rays within the formation which at various times will impinge on LS and SS detectors 14 and 16. As each gamma ray thus impinges upon the crystal-photomultiplier tube arrangement of the detectors, a voltage pulse having an amplitude functionally related to the energy of the particular gamma ray is delivered to detector board 22. Detector board 22 amplifies each pulse and compares them to an adjustable discriminator level, typically set at a value corresponding to approximately 100 keV. If such pulse has an amplitude corresponding to an energy of at least approximately 100 keV, the voltage pulse is transformed into a digital signal and passed to channel generator 26 of MCS section 24.

Figure 1B:
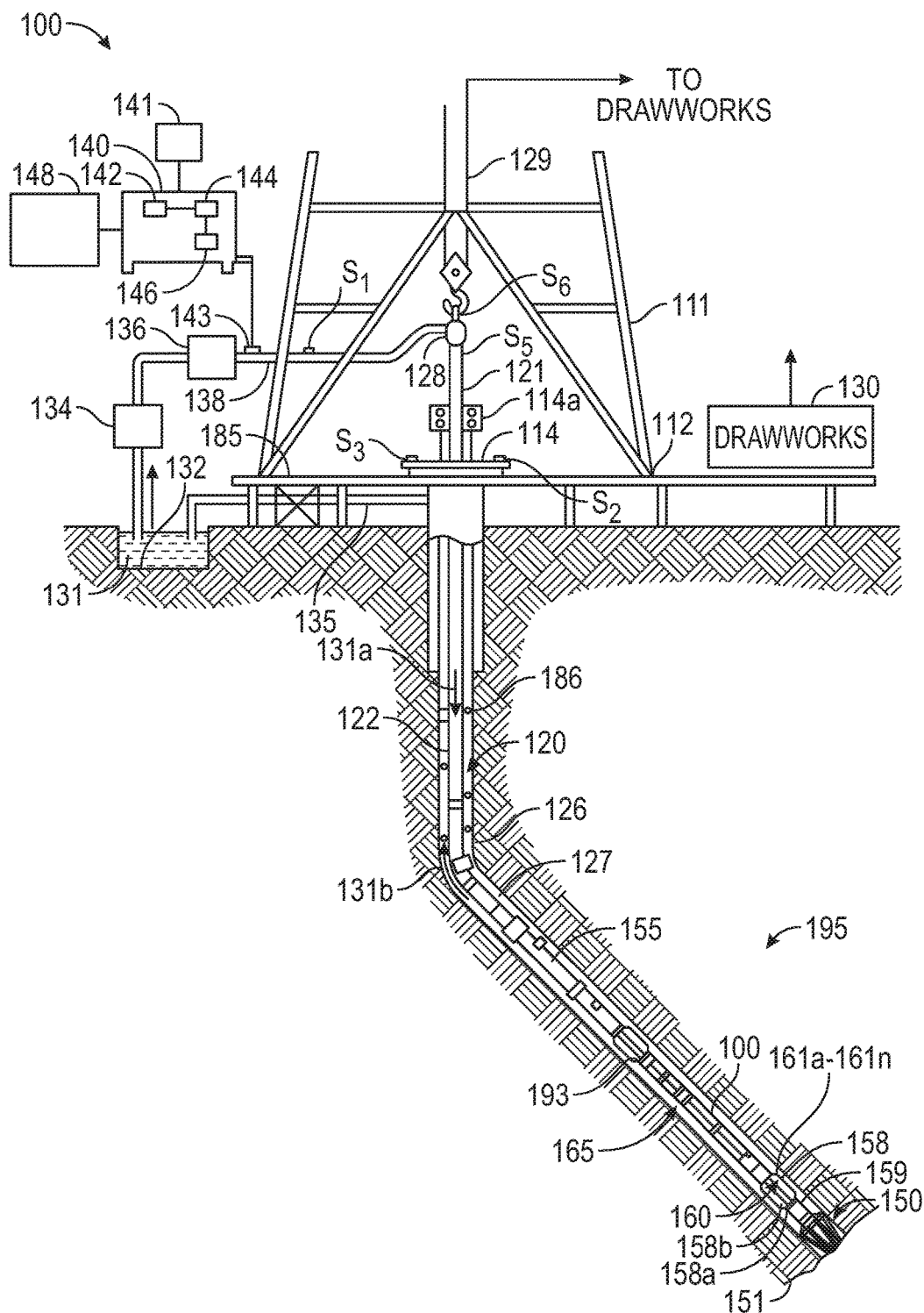
FIG. 1B is a schematic diagram of an exemplary drilling system 100 that includes a drill string having a drilling assembly attached to its distal end in accordance with embodiments of the present disclosure.

FIG. 1B is a schematic diagram of an exemplary drilling system 100 that includes a drill string having a drilling assembly attached to its bottom end that includes a steering unit according to one embodiment of the disclosure. FIG. 1B shows a drill string 120 that includes a drilling assembly or bottomhole assembly (BHA) 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 respectively provide information about the torque and the rotational speed of the drill string 120. Tubing injection speed is determined from the sensor Ss, while the sensor $S_6$ provides the hook load of the drill string 120.

In some applications, the drill bit 150 is rotated by only rotating the drill pipe 122. However, in many other applications, a downhole motor 155 (mud motor) disposed in the drilling assembly 190 also rotates the drill bit 150. The rate of penetration (ROP) for a given BHA largely depends on the WOB or the thrust force on the drill bit 150 and its rotational speed.

The mud motor 155 is coupled to the drill bit 150 via a drive shaft disposed in a bearing assembly 157. The mud motor 155 rotates the drill bit 150 when the drilling fluid 131 passes through the mud motor 155 under pressure. The bearing assembly 157, in one aspect, supports the radial and axial forces of the drill bit 150, the down-thrust of the mud motor 155 and the reactive upward loading from the applied weight-on-bit.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165. The BHA 190 may further include a variety of other sensors and devices 159 for determining one or more properties of the BHA 190 (such as vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.) For convenience, all such sensors are denoted by numeral 159.

The BHA 190 may include a steering apparatus or tool 158 for steering the drill bit 150 along a desired drilling path. In one aspect, the steering apparatus may include a steering unit 160, having a number of force application members 161a-161n, wherein the steering unit is at partially integrated into the drilling motor. In another embodiment the steering apparatus may include a steering unit 158 having a bent sub and a first steering device 158a to orient the bent sub in the wellbore and the second steering device 158b to maintain the bent sub along a selected drilling direction.

The drilling system 100 may include sensors, circuitry and processing software and algorithms for providing information about desired dynamic drilling parameters relating to the BHA, drill string, the drill bit and downhole equipment such as a drilling motor, steering unit, thrusters, etc. Exemplary sensors include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 100 can include one or more downhole processors at a suitable location such as 193 on the BHA 190. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 142 can process the surface measured data, along with the data transmitted from the downhole processor, to evaluate formation lithology. While a drill string 120 is shown as a conveyance system for sensors 165, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 100 may include a bottomhole assembly and/or sensors and equipment for implementation of embodiments of the present disclosure on either a drill string or a wireline. A point of novelty of the system illustrated in FIG. 1 is that the surface processor 142 and/or the downhole processor 193 are configured to perform certain methods (discussed below) that are not in prior art.

Figure 2:
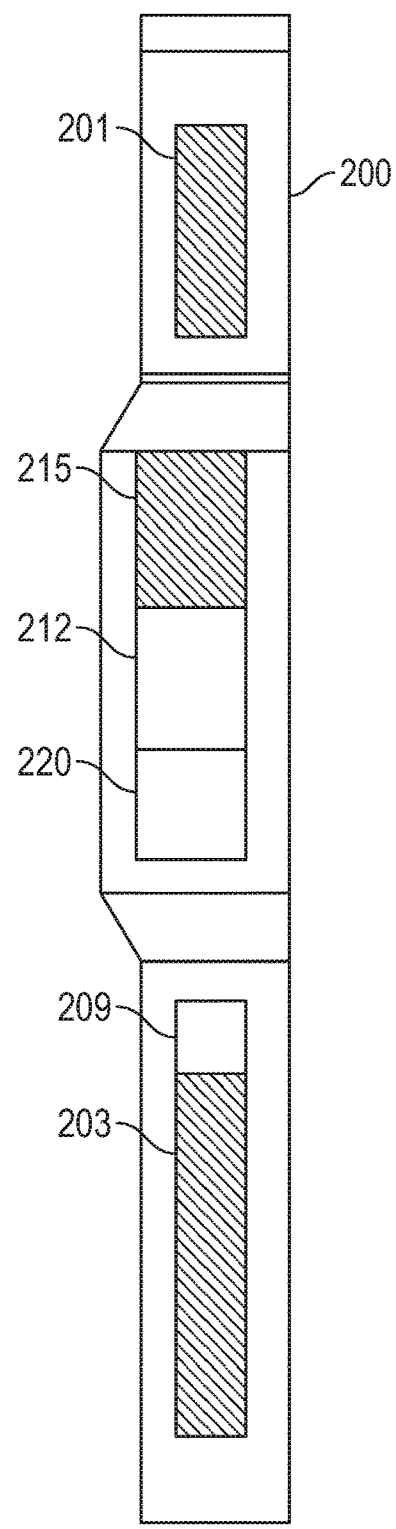
FIG. 2 illustrates a schematic diagram of an instrument suitable for use in accordance with embodiments of the present disclosure.

FIG. 2 illustrates a schematic diagram of an instrument suitable for use with the present invention. The Formation Lithology Explorer™ ('FLEX') is a wireline instrument designed to provide formation mineralogical information, shale identification, and clay typing. The enhanced mineralogical data obtained from the FLEX also enables enhanced porosity measurements. The present invention is usable in open-hole wireline logging systems. In a typical embodiment, the present invention uses the ECLIPS™ acquisition system of Baker Hughes Incorporated. Alternatively, the present invention can be used, for example, with the FOCUS system of Baker Hughes, Incorporated. Also, under most conditions, the FLEX™ is run in combination with Gamma Ray/Spectralog, Neutron, and Density nuclear tools in addition to tools such as resistivity, acoustics, NMR and others. The FLEX utilizes an axial pulsed neutron generator of the same type as that used in the reservoir performance monitor instruments. Thus, there are no special storage or transportation requirements except those of a regulatory nature associated with pulsed neutron generators. The logging speed is dependent upon the environment. A typical logging speed is in the range of 15-60 feet/minute.

The FLEX™ measurement device of FIG. 2 employs the principle of neutron-induced gamma ray spectroscopy. FLEX™ component parts may be encapsulated within wireline device casing 200. The neutron source of the present invention is typically a pulsed neutron source. The use of a pulsed neutron source is advantageous over the use of a chemical neutron source due to its ability to generate inelastic gamma rays over a wider range of energies. It also allows a spectrum of capture gamma rays to be generated which is free from inelastic gamma ray contamination, which can also be corrected for background activation gamma rays. Neutron source 209 discharges high-energy bursts of neutrons into the surrounding formation. The electronic pulsed neutron generator is typically operated at a rate of approximately 10,000 Hz, so that each burst takes place within a 100 microsecond window. Gamma rays produced via interaction of the discharged neutrons and the formation are detected at the scintillation detector 212 attached to acquisition and telemetry electronics 215. Power supply 201 enables the FLEX device. Electronics 203 enables the neutron source. A shield 220 attenuates the neutron flux propagating directly from the source to the detector as well as attenuating gamma rays generated within the shield.

While a wireline is shown as a conveyance system for the nuclear detection module, it should be understood that embodiments of the present disclosure may be used in connection with tools conveyed via rigid (e.g. jointed tubular or coiled tubing) as well as non-rigid (e.g. wireline, slickline, e-line, etc.) conveyance systems.

Figure 3:
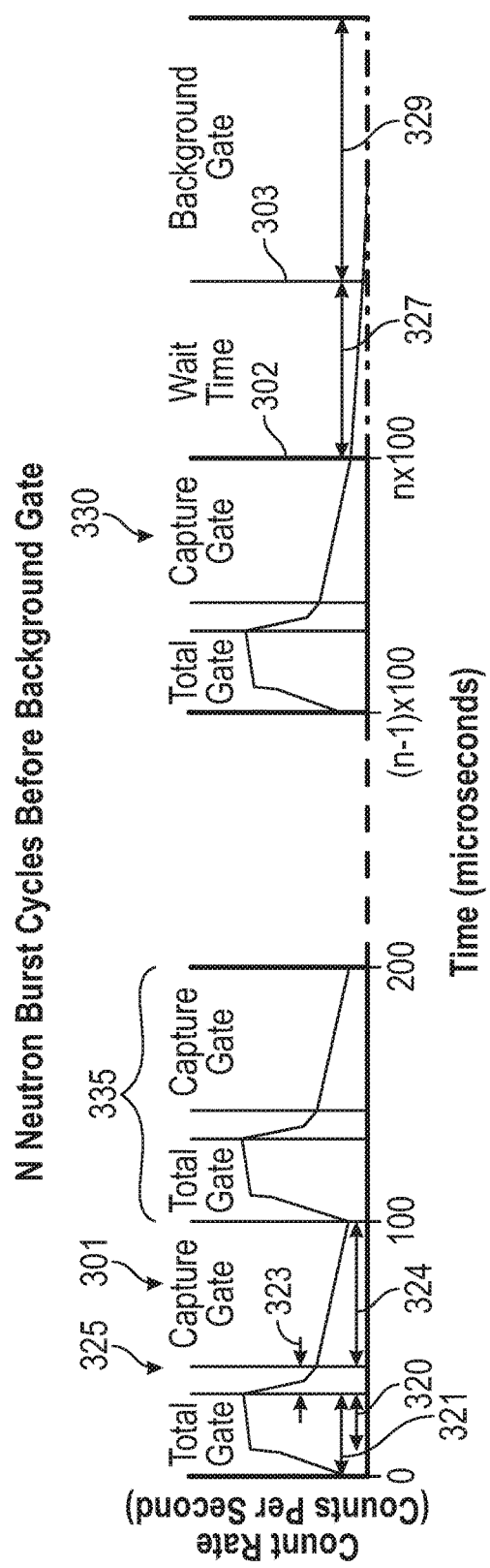
FIG. 3 illustrates the basic timing of a pulsed neutron source and produced gamma rays in accordance with embodiments of the present disclosure.

FIG. 3 illustrates the basic timing of the pulsed neutron source and the produced gamma rays. Time is displayed along the x-axis in microseconds. The gamma ray counts per second (cps) is displayed along the y-axis. The neutron burst is over a time interval 321 and defines a first-detector-gate interval, referred to as the "burst gate" or inelastic gate. A measurement series 330 comprising a number of burst cycles 335 are conducted with the tool. A total spectrum 325 of gamma rays resulting from both inelastic neutron scattering and capture gamma ray scattering is produced during the active duration of the neutron source, and the timing of the inelastic gate enables obtaining the total spectrum. In the example of FIG. 3, the number of counts rises significantly (e.g., to approximately $10^5$) during the inelastic gate interval 320, which extends approximately from 10 μsec to 40 μsec. The deactivation of the neutron source causes the inelastic gamma rays to disappear from the count almost immediately.

A "dead-zone" 323 is shown at a point substantially coincident with deactivation of the neutron source. This dead-zone extends approximately from 40 μsec to 50 μsec. The counts obtained during this interval may not be recorded, and the interval may be referred to as a primary waiting time because the interval is often designed to insure inelastic gamma rays have fallen to nominal levels. During the corresponding interval 323, extending approximately from 40 μsec to 50 μsec, the counts obtained during the waiting time are attributable to background gamma rays, but also to capture gamma rays, which make up a significant portion of the spectrum during the background gate. The dead-zone is followed by a "capture gate" 301 over interval 324. The capture gate contains gamma rays substantially due to captured neutrons from the surrounding formation and ends when the count rate has decayed to a level where the count information is substantially unnecessary (e.g., redundant, inaccurate, and/or otherwise unrepresentative of the formation properties). If another pulse cycle is scheduled, it may begin at this point.

A "secondary wait time" in an interval 327 from the end of the last pulse cycle at time 302 is shown at a point substantially coincident with the end of the capture gate. This interval may be referred to as a secondary wait time because the interval is often designed to insure thermal neutrons have fallen to nominal levels. At point 303, after the thermal neutrons of the system have fallen to nominal levels, a background gate may be measured in interval 329. In time interval 329, the radiation measurable at the tool may predominantly comprise gamma rays emitted by decay of radionuclides produced by neutron activation reactions resulting from the irradiation. Although the secondary wait time and the background gate are depicted in intervals 327 and 329 at the end of the measurement series, in other implementations these intervals may occur in the middle of the series prior to the last pulse cycle.

In techniques of the present disclosure, a calibration radiation spectrum is generated using measurements of radiation with the detector within time interval 323 at logging speeds where the radiation comprises predominantly gamma rays emitted by decay of radionuclides produced by neutron activation reactions resulting from the irradiation of the formation by the pulsed neutron source.

In an exemplary embodiment of the present invention, energized neutrons are injected from a pulsed neutron source 209 into a surrounding formation. The scintillation detector records the spectrum over a predetermined time interval. During the inelastic gate, a total spectrum of gamma rays is obtained from the formation layer. During a capture gate, a capture spectrum of gamma rays is obtained from the formation layer. A determinable factor of the capture spectrum can be subtracted from the obtained total spectrum to derive a spectrum substantially representative of an inelastic spectrum only. The elemental contribution to the inelastic spectrum and the capture spectrum can then be determined by determining a first constituent spectrum from the inelastic spectrum and a second constituent spectrum from the capture spectrum. An operator versed in the arts can then use the determined elemental contributions to determine a parameter of the surrounding formation.

Figure 4:
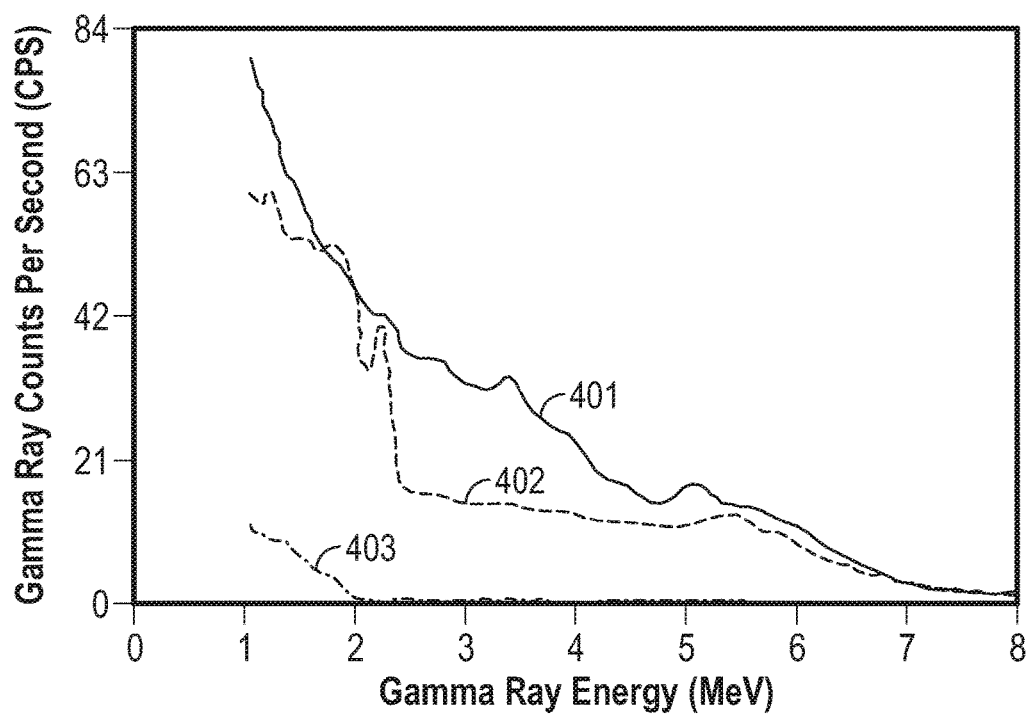
FIG. 4 shows capture and inelastic spectra from limestone formation with oil-filled borehole.

The derived gamma ray energy spectra for data analysis comprise both the capture spectrum and the inelastic spectrum. An inelastic gamma ray is generated from the nucleus of the atom from which there is a scattering of initial highly energetic neutrons. A capture gamma ray is emitted by the nucleus of an atom through absorption of a neutron after its energy has diminished. FIG. 4 shows capture and inelastic spectra from limestone formation with oil-filled borehole. The three spectra are the inelastic spectrum 401, the capture spectra 402, and the dead-zone spectrum 403.

One feature of the present invention is the analysis is the use of activation gamma rays measured in the background gate to map a channel in which a peak is detected within the background gate to a known energy level corresponding to the peak.

One or more nuclear radiation sensors disposed along the downhole tool may be configured to generate a signal indicative of nuclear radiation detected. The detected nuclear radiation may include gamma rays. Gamma rays (or other radiation emissions) resulting from neutron irradiation of nuclides in the formation (that is, produced by daughter nuclides resulting from an (n,p) reaction brought about by the irradiation) may subsequently undergo interactions with the atoms making up the formation, before some of the gamma rays reach a detector.

Gamma rays emitted by N-16 may be used for building the mapping function described above. Elementally speaking, a typical earth formation has a significant amount of oxygen (e.g., around 45% to 50% by weight). About 99.8% of elemental oxygen is in the form of O-16. When O-16 is subjected to very high energy neutrons, it undergoes a (n,p) reaction resulting in N-16 nuclides. N-16 is not a stable nuclide and it decays with a half life of 7.13 seconds. Due to this relatively short half life, N-16 buildup reaches a saturation value very rapidly. This may be quite advantageous in oil well logging applications, because when logging tools are in motion a sufficient buildup of N-16 should take place by the time the detectors reach the position where activation takes place.

Figure 5:
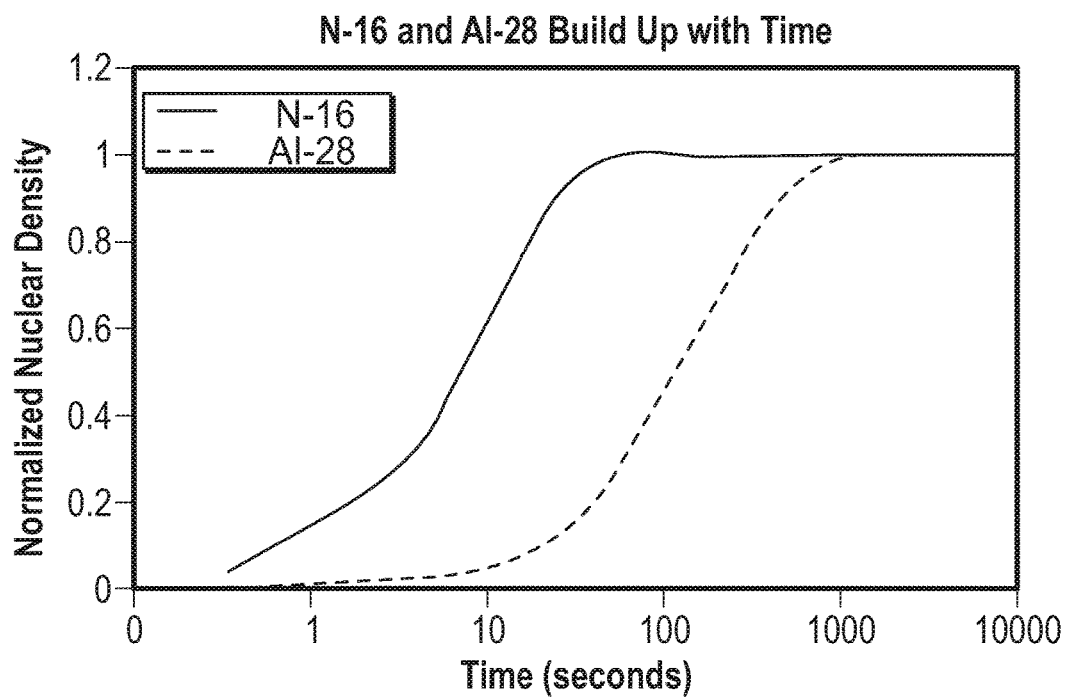
FIG. 5 shows a comparison of N-16 buildup and Al-28 buildup due to activation in accordance with embodiments of the present disclosure.

FIG. 5 shows a comparison of N-16 buildup and Al-28 buildup (from O-16 and Si-28, respectively) due to activation. When the data is acquired in the background gate, it displays gamma rays only from the N-16 gamma ray emission. With that, it is possible to determine what channel those gamma rays are in.

As FIG. 5 shows, Al-28 buildup from Si-28 lags considerably compared to N-16 buildup. As a result, it may be safely postulated that data acquisition in the background gates of pulsed neutron tools will favor recording gamma rays emitted by N-16. Since the acquired spectra from a single source, the resulting signal is very "clean"—that is, the signal is substantially unaffected by gamma rays other than N-16.

Figure 6:
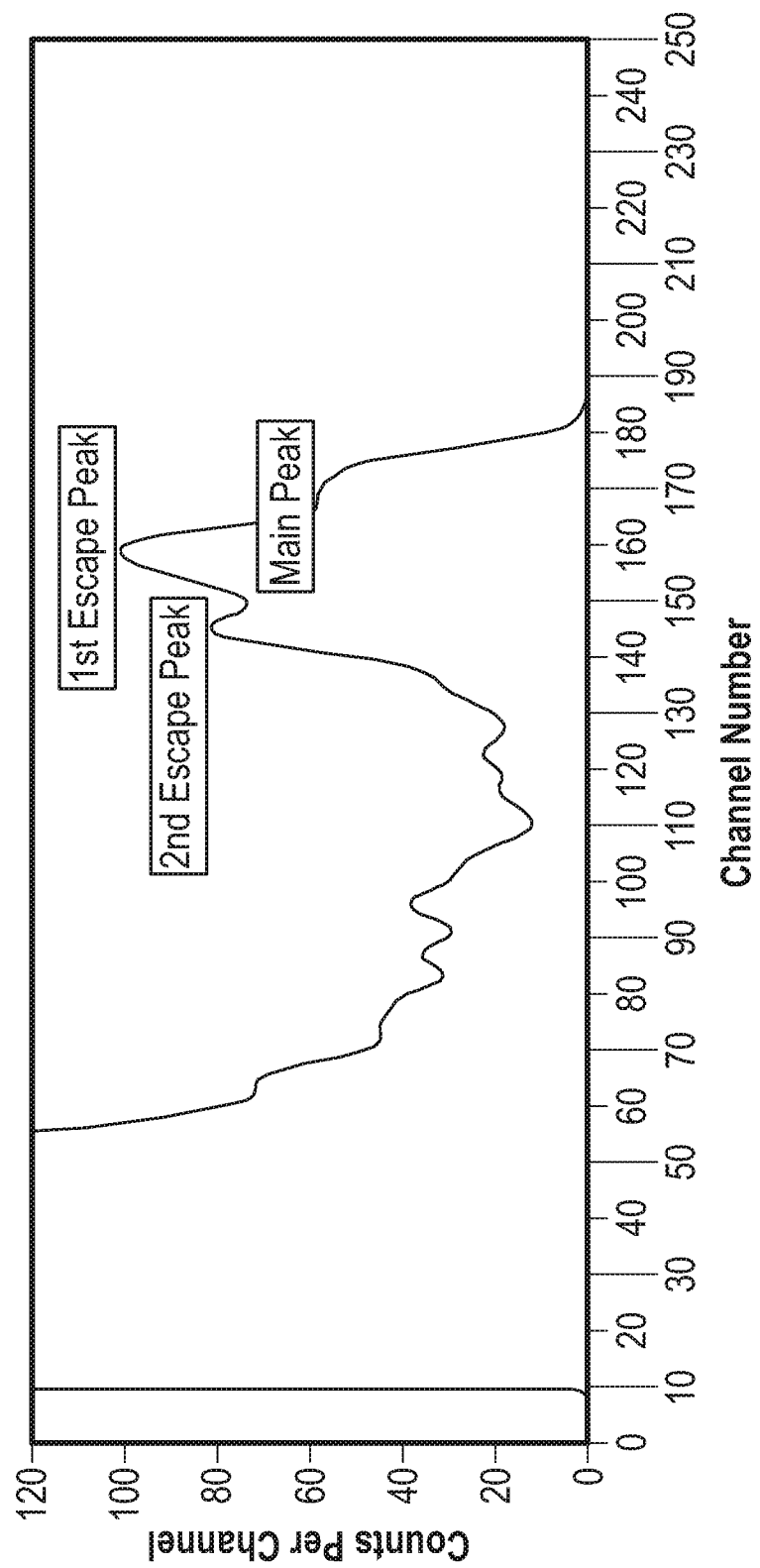
FIG. 6 shows a background spectrum of N-16 gamma rays.

FIG. 6 shows a background spectrum of N-16 gamma rays. The main peak, first escape peak, and second escape peak are clearly identifiable. The energy of the main peak seen around channel 172 is well known and corresponds with 6.13 MeV. The first and second escape peaks have, respectively, 0.511 MeV and 1.02 MeV less energy than the main peak. Identification of the peak using the spectrum signal acquisition techniques disclosed herein thus becomes straightforward.

Alternatively, other implementations may include determining a mean peak channel for the spectrum, and assigning an energy value to the mean for use in generating an energy mapping function. Even with increasing temperature and degrading resolution, it is possible to determine a mean peak channel which may be used under all operating temperatures.

Figure 7:
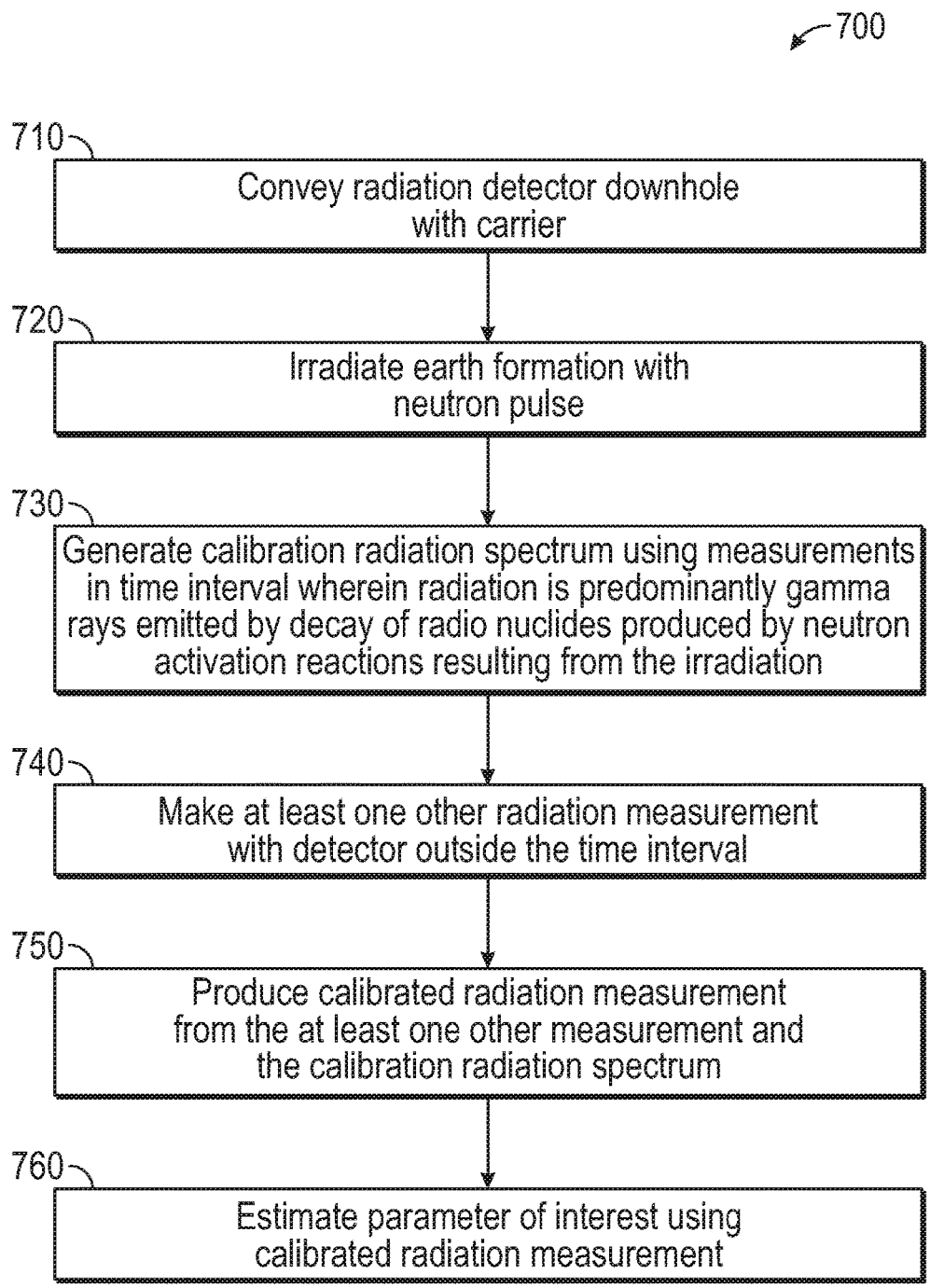
FIG. 7 illustrates methods in accordance with embodiments of the present disclosure.

FIG. 7 illustrates methods in accordance with embodiments of the present disclosure. Optional step 710 of method 700 comprises conveying a radiation detector downhole using a carrier. Step 720 comprises irradiating the earth formation with a neutron pulse produced by a pulsed neutron source disposed in the borehole to produce gamma-rays.

Step 730 comprises generating a calibration radiation spectrum using measurements of radiation with the detector in a time interval wherein the radiation comprises predominantly gamma rays emitted by decay of radionuclides produced by neutron activation reactions resulting from the irradiation. The interval may follow a prior time interval corresponding with thermal neutrons produced from the irradiation. The prior time interval may begin with the cessation of the neutron pulse. Making measurements in the time interval may be carried out by conveying the radiation detector in the borehole at high speed and using a background gate of the detector.

Step 740 may include making at least one other radiation measurement with the detector outside the time interval. The at least one other radiation measurement (made in the at least one other time interval) may measure radiation comprising gamma rays predominantly resulting from at least one of inelastic scattering and capture of neutrons. Each of the measurements and the other measurements may comprise a count having an associated relative energy channel. The calibration radiation spectrum may comprise an expression of gamma ray count rate with respect to relative energy channel for the measurements of radiation with the detector in the time interval. Each relative energy channel may be initially associated with or represented by a placeholder value, such as, for example, the energy value resulting from a previous calibration. Alternatively, the energy channel may be represented by a channel number or the like.

Step 750 comprises producing a calibrated radiation measurement from the at least one other radiation measurement using the calibration radiation spectrum. A set of calibrated radiation measurements may be assembled to generate a calibrated measurement spectrum. Producing the calibrated radiation measurement may include identifying at least one peak associated with a radionuclide resulting from neutron activation reactions and assigning an energy level to each radiation measurement of the at least one other radiation measurement in dependence upon a standard energy level corresponding to each of the at least one peak.

Assigning an energy level to each radiation measurement may be carried out by using the standard energy level corresponding to each of the at least one peak to generate a mapping function associating the calibration radiation spectrum to the standard energy level corresponding to each of the at least one peak; and using the mapping function to associate relative energy channels with corresponding final energy values. Optionally, step 760 of method 700 may include estimating a parameter of interest using the calibrated radiation measurement, as described below.

Alternatively, producing a calibrated radiation measurement may comprise determining a correction factor using the standard energy level corresponding to each peak of the at least one peak, and producing a calibrated radiation measurement by applying the correction factor to the at least one other radiation measurement.

Alternate embodiments may include determining a mean channel for the calibration radiation spectrum; using a standard energy level corresponding to the mean channel to generate a mapping function; and using the mapping function to associate relative energy channels with corresponding final energy values.

Methods may optionally include conducting further operations in the formation in dependence upon the calibrated radiation measurement. The further operations may comprise at least one of: i) geosteering; ii) drilling at least one borehole in the formation; iii) performing measurements on the formation; iv) estimating at least one parameter of interest of the formation; v) installing equipment in a borehole in the formation; vi) evaluating the formation; vii) optimizing development in the formation; viii) optimizing development in a formation related to the formation; ix) optimizing exploration in the formation; x) optimizing exploration in a formation related to the formation; xi) producing at least one hydrocarbon from the formation.

Since a gamma ray count may include gamma rays from multiple elements, the gamma ray count information may be separated using a model into gamma ray components associated with each element. Herein, "information" may include raw data, processed data, analog signals, and digital signals. In some embodiments, the model may include, but is not limited to, one or more of: (i) a mathematical equation, (ii) an algorithm, (iii) an energy spectrum deconvolution technique, (iv) a stripping technique, (v) an energy spectrum window technique, (vi) a time spectrum deconvolution technique, and (vii) a time spectrum window technique. The gamma ray component for at least one nuclide may be used to estimate at least one parameter of interest of the earth formation. The at least one parameter of interest may include, but is not limited to, one or more of: (i) density, (ii) porosity, and (iii) fluid saturation. A description for some embodiments estimating the at least one parameter of interest follows below.

In some embodiments, estimation of the parameter of interest may involve applying a model. The model may include, but is not limited to, (i) a mathematical equation, (ii) an algorithm, (iii) an energy spectrum deconvolution technique, (iv) an energy spectrum stripping technique, (v) an energy spectrum window technique, (vi) a time spectrum deconvolution technique, (vii) a time spectrum window technique, or a combination thereof.

Natural gamma ray measurements may be subjected to an elemental analysis to give an estimate of K, Th, and U. Pulsed neutron measurements may be subject to an elemental analysis to give other elements such as Ca, CI, Fe, Mg, Si, and S. The outputs of the elemental analyses, density measurements, and porosity measurements may be input to a constrained optimization module in a processor. The output of the constrained optimization module may be the mineralogy. Quadratic programming may include a quadratic objective function of the form $g^T x + \frac{1}{2} x^T H x$. Other constraints may include bound constraints (bl≤x≤bu), linear constraints (Ax≤b) and non-linear constraints (C(x)≤0). Here, g is the gradient of f at the current point x, f is the objective function, H is the Hessian matrix (the symmetric matrix of second derivatives). An objective function is minimized at each sample (depth) of the logs independently of the other depths. The objective function may be a summation from i to k of the value (Logdata$_i$–f$_i$ (component volumes))$^2$/Var$_i$. There are a total of k input logs which may include density, porosity, and photoelectric factor (PE) as well as the logs from elemental analysis. The function f$_i$ relates the mineralogy at each depth to the value of the i-th log. The weighting function Var$_i$ gives different weights to the different logs depending upon their accuracy. Generally speaking, density and porosity measurements have the largest weights. A processor may use the predicted mineralogy of the formation to estimate relevant nuclear density values, and/or calculate a correction factor using the relevant nuclear density values.

Methods of the present disclosure may include determining the concentration in the system (e.g., the formation and borehole fluid) of significant nuclides such as, for example, oxygen and carbon. This may be carried out using a neutron induced gamma ray mineralogy measurement obtained along with the density measurement system. The same can also be achieved by measuring sourceless density and using an existing mineralogy log from a previous logging run. In both cases, it is possible to estimate a total oxygen concentration and a total carbon concentration in the system. Since the oxygen and carbon amount is linearly correlated with the gamma ray source to be used for density measurements, the oxygen, carbon and any other relevant element concentration measurement may be used to normalize the gamma ray source. The methods herein may occur in real-time using a tool that has both density and neutron induced gamma mineralogy systems on board. Alternatively, a sourceless density log may be processed subsequent to the logging run with mineralogy data sufficient to estimate oxygen content, carbon content, and/or any other relevant element content for normalizing the gamma ray source. Either embodiment enables removal of all other variables from the measurement except the formation density.

Returning to FIG. 1A, certain embodiments of the present disclosure may be implemented with a hardware environment 80 that includes an information processor 81, a information storage medium 83, an input device 85, processor memory 87, and may include peripheral information storage medium 89. The hardware environment 80 may be in the well, at the rig, or at a remote location. Moreover, the several components of the hardware environment may be distributed among those locations. The input device 85 may be any information reader or user input device, such as data card reader, keyboard, USB port, etc. The information storage medium 83 stores information provided by the detectors. Information storage medium 83 may be any standard computer information storage device, such as a ROM, USB drive, memory stick, hard disk, removable RAM, EPROMs, EAROMs, EEPROM, flash memories, and optical disks or other commonly used memory storage system known to one of ordinary skill in the art including Internet based storage. Information storage medium 83 stores a program that when executed causes information processor 81 to execute the disclosed method. Information storage medium 83 may also store the formation information provided by the user, or the formation information may be stored in a peripheral information storage medium 89, which may be any standard computer information storage device, such as a USB drive, memory stick, hard disk, removable RAM, or other commonly used memory storage system known to one of ordinary skill in the art including Internet based storage. Information processor 81 may be any form of computer or mathematical processing hardware, including Internet based hardware. When the program is loaded from information storage medium 83 into processor memory 87 (e.g. computer RAM), the program, when executed, causes information processor 81 to retrieve detector information from either information storage medium 83 or peripheral information storage medium 89 and process the information to estimate a parameter of interest. Information processor 81 may be located on the surface or downhole.

An "interaction" may be described as an event causing a change in energy and direction of incident radiation (e.g., a gamma ray) prior to measurement of the radiation and absorption of the radiation. An "interaction" may induce emission of secondary radiation as well (e.g. emission of a secondary neutron and/or gamma ray). Normalizing may refer to adjusting values measured on different scales to a notionally common scale, so that variation in the values corresponds to a variation of single factor. Formation lithology may include formation mineral type, porosity, and fluid in the pore space. Mineralogy may include the chemical composition and structure of minerals in the formation.

Herein, the term "information" may include, but is not limited to, one or more of: (i) raw data, (ii) processed data, and (iii) signals. The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices (carriers) include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The "correction factor" may be applied in additive (or subtractive) or multiplicative fashion to the radiation information. "Radiation responsive" is defined as the characteristic of being sensitive to radiation so as to produce a detectable emission in response to absorbing radiation such that the absorbed radiation is quantifiable according to the emissions. As used above, the term "incident" or "incident on" refers to impinging on the physical space of or penetrating the defining boundaries of (e.g., entering a media).

While the foregoing disclosure is directed to the one mode embodiments of the disclosure, various modifications will be apparent to those skilled in the art. It is intended that all variations be embraced by the foregoing disclosure.

What is claimed is:

1. A method of gamma ray energy spectra calibration for a radiation detector in a borehole intersecting a volume of an earth formation, comprising:
   irradiating the earth formation with a neutron pulse produced by a pulsed neutron source disposed in the borehole to produce gamma-rays;
   generating a calibration radiation spectrum using measurements of radiation with the detector in a time interval, wherein the radiation of the measurements consists of gamma rays emitted by decay of radionuclides produced by neutron activation reactions resulting from the irradiation, the time interval following a prior time interval, wherein the prior time interval corresponds with thermal neutrons produced from the irradiation and begins with the cessation of the neutron pulse;
   making at least one other radiation measurement with the detector outside the time interval; and
   producing a calibrated radiation measurement from the at least one other radiation measurement using the calibration radiation spectrum.

2. The method of claim 1, wherein each of the measurements and the other measurements comprises a count having an associated relative energy channel, and the calibration radiation spectrum comprises an expression of gamma ray count rate with respect to relative energy channel for the measurements of radiation with the detector in the time interval.

3. The method of claim 2, wherein producing the calibrated radiation measurement comprises:
   identifying at least one peak associated with a radionuclide resulting from neutron activation reactions; and
   assigning an energy level to each radiation measurement of the at least one other radiation measurement in dependence upon a standard energy level corresponding to each of the at least one peak.

4. The method of claim 3, wherein assigning an energy level to each radiation measurement comprises:
   using the standard energy level corresponding to each of the at least one peak to generate a mapping function associating the calibration radiation spectrum to the standard energy level corresponding to each of the at least one peak; and
   using the mapping function to associate relative energy channels with corresponding final energy values.

5. The method of claim 3, comprising determining a correction factor using the standard energy level corresponding to each of the at least one peak, and producing a calibrated radiation measurement by applying the correction factor to the at least one other radiation measurement.

6. The method of claim 1, comprising generating a calibrated measurement spectrum.

7. The method of claim 1, wherein the at least one other radiation measurement made in the at least one other time interval measures radiation comprising gamma rays resulting from at least one of inelastic scattering and capture of neutrons.

8. The method of claim 1, comprising making the measurements in the time interval following irradiation by conveying the radiation detector in the borehole at high speed and using a background gate of the detector.

9. The method of claim 1, comprising:
   determining a mean channel for the calibration radiation spectrum;
   using a standard energy level corresponding to the mean channel to generate a mapping function; and
   using the mapping function to associate relative energy channels with corresponding final energy values.

10. The method of claim 1, comprising conducting further operations in the formation in dependence upon the calibrated radiation measurement.

11. The method of claim 10, wherein the further operations comprise at least one of: i) geosteering; ii) drilling at least one borehole in the formation; iii) performing measurements on the formation; iv) estimating at least one parameter of interest of the formation; v) installing equipment in a borehole in the formation; vi) evaluating the formation; vii) optimizing development in the formation; viii) optimizing development in a formation related to the formation; ix) optimizing exploration in the formation; x) optimizing exploration in a formation related to the formation; xi) producing at least one hydrocarbon from the formation.

12. An apparatus for gamma ray energy spectra calibration for at least one radiation detector for use in a borehole intersecting a volume of an earth formation, comprising:
   at least one radiation detector configured for conveyance by a carrier and configured to generate information representative of nuclear radiation from the formation; and
   an information processing device configured to:
      generate a calibration radiation spectrum using measurements of radiation with the detector in a time interval, wherein the radiation of the measurements consists of gamma rays emitted by decay of radionuclides produced by neutron activation reactions resulting from irradiation of the earth formation with a neutron pulse, the time interval following a prior time interval, wherein the prior time interval corresponds with thermal neutrons produced from the irradiation and begins with the cessation of the neutron pulse;
      make at least one other radiation measurement with the detector outside the time interval; and
      produce a calibrated radiation measurement from the at least one other radiation measurement using the calibration radiation spectrum.

13. The apparatus of claim 12, wherein each of the measurements and the at least one other measurement comprises a count having an associated relative energy channel, and the calibration radiation spectrum comprises an expression of gamma ray count rate with respect to relative energy channel for the measurements of radiation with the detector in the time interval.

14. The apparatus of claim 13, wherein the information processing device is configured to:
   identify at least one peak associated with a radionuclide resulting from neutron activation reactions; and
   assign an energy level to each radiation measurement of the at least one other radiation measurement in dependence upon a standard energy level corresponding to each of the at least one peak.

15. The apparatus of claim 14, wherein the information processing device is configured to:

use the standard energy level corresponding to each of the at least one peak to generate a mapping function associating the calibration radiation spectrum to the standard energy level corresponding to each of the at least one peak; and use the mapping function to associate relative energy channels with corresponding final energy values.

16. The apparatus of claim 14, wherein the information processing device is configured to determine a correction factor using the standard energy level corresponding to each of the at least one peak, and producing a calibrated radiation measurement by applying the correction factor to the at least one other radiation measurement.

17. The apparatus of claim 12, wherein the information processing device is configured to generate a calibrated measurement spectrum.

18. The apparatus of claim 12, wherein the at least one other radiation measurement made in the at least one other time interval measures radiation comprising gamma rays predominantly resulting from at least one of inelastic scattering and capture of neutrons.

19. The apparatus of claim 12, wherein the information processing device is configured to make the measurements in the time interval following irradiation by conveying the radiation detector in the borehole at high speed and using a background gate of the detector.

20. The apparatus of claim 12, comprising a pulsed neutron source, wherein the information processing device comprises:

at least one processor; and a memory storage medium accessible to the at least one processor.

* * * * *